United States Patent [19]
Matsumura et al.

[11] 3,954,699
[45] May 4, 1976

[54] PROCESS FOR POLYMERIZING CYCLOOLEFINES

[75] Inventors: Shoichi Matsumura, Akashi; Itaru Hatano, Kobe, both of Japan

[73] Assignee: Kanegafuchi Kagaku Kogyo Kabushiki Kaisha, Osaka, Japan

[22] Filed: Aug. 30, 1974

[21] Appl. No.: 501,864

Related U.S. Application Data

[63] Continuation-in-part of Ser. No. 247,421, April 25, 1972, abandoned.

[30] Foreign Application Priority Data

Apr. 28, 1971  Japan.................................. 46-28440

[52] U.S. Cl.......................... 526/308; 260/33.6 UA; 526/97; 526/96; 526/107
[51] Int. Cl.²........................................... C08F 4/24

[58] Field of Search.................... 260/88.2 B, 88.2 F, 260/93.1; 450/744

[56] References Cited
UNITED STATES PATENTS

| | | | |
|---|---|---|---|
| 3,074,918 | 1/1963 | Eleuterio | 260/93.1 |
| 3,772,255 | 11/1973 | Bell | 260/88.2 D |
| 3,846,392 | 11/1974 | Matsumura et al. | 260/93.1 |

*Primary Examiner*—Stanford M. Levin
*Attorney, Agent, or Firm*—Moonray Kojima

[57] ABSTRACT

A Process for polymerizing cycloolefins by ring opening reaction using heterogeneous catalyst containing tungsten trioxide and Lewis acid or tungsten trioxide, Lewis acid and organoaluminum compound as the polymerization catalyst.

8 Claims, No Drawings

PROCESS FOR POLYMERIZING CYCLOOLEFINES

BACKGROUND OF THE INVENTION

This is a continuation-in-part application of Ser. No. 247,421 filed Apr. 25, 1972, now abandoned.

This invention relates to a process for polymerizing cycloolefins using a novel catalyst.

In the prior art, it has been reported that as polymerization catalysts for cycloolefins, catalysts have been used containing salts of transition metals of the IVB group or the VIB group, such as tungsten hexachloride and organo aluminum compound. But these are soluble homogeneous catalysts. (G. Natta et al.; Makromole, Chem. 91, 87 (1966); Japanese Patent Publication No. 20784/1967; N. Calderon et al., J. Polychem. Sci. A-1, 5, 2209 (1967).

Also, Bell U.S. Pat. No. 3,772,255 teaches a method for ring opening polymerization of cycloolefins using as a catalyst a mixture of tungsten oxide and either aluminum chloride or alkyl aluminum dichloride in the ratio of 3:2 to 2:3. The polymerization rate, however, leaves much to be desired; the rate is very low.

SUMMARY OF THE INVENTION

On the other hand, catalysts used in the present invention are inhomogeneous, i.e. heterogeneous, catalysts containing tungsten trioxide which is not essentially a salt of a transition metal, and a Lewis acid; or a system containing organoaluminum compound in order to increase their activity, such as inhomogeneous, i.e. heterogeneous, solid catalyst containing tungsten trioxide, Lewis acid and organo aluminum compound, which was found to be an extremely highly active catalyst system.

A salt of a transition metal such as tungsten hexachloride, is known to be used as a polymerization catalyst. But, such salt has many disadvantages in that it is expensive and careful handling is required because it reacts with moisture in air easily.

On the other hand, the tungsten trioxide used in the present invention is extremely stable compound. It is known that tungsten trioxide reacts with Lewis acid, such as aluminum chloride to form oxi-chloride at extremely high temperatures. However, surprisingly using the present invention, it was confirmed that cycloolefins were polymerized with the inventive catalyst under conditions where no oxichloride was formed.

In addition, it has been proven in the Examples set forth herein that the catalyst of the present invention has extremely interesting properties and the use of tungsten salt is not necessary. Cycloolefins were polymerized with heterogeneous catalyst containing tungsten trioxide and organometallic compound containing no halogen atom, such as triethyl aluminum.

In contrast to the above-mentioned Bell, the present invention employes tungsten trioxide and Lewis acid in the ratio of ⅓ to 1/30, preferably. It was discovered by the present inventors that the polymerization rate was unexpectedly substantially greater than use of the ratio of ⅔ to 3/2 as in Bell. The amount of increase was over 8 fold, ranging from 25% to 65% per hour, in contrast to Bell which produced polymerization rates of about 3% per hour at the ratio of 1/1.

DETAILED DESCRIPTION OF PREFERRED EMBODIMENTS

The invention encompasses the polymerization of cycloolefins. As the cycloolefins, one may select cyclic unsaturated hydrocarbons containing at least one double bond in a ring of $C_7$ to $C_{12}$. For example, 1,5-cyclooctadiene; 1,5,9-cyclododecatriene, cyclooctene and the like may be used. The catalyst of the present invention advantageously enables the polymerization to proceed with better stereo regularity in considerable extent, as well as being economical and easy handling. For example, 1,4-polybutadiene containing 80% of cis double bonds and 20% of trans double bonds was obtained from cis, cis-1, 5-cyclooctadiene. Polymer of 1,4-polybutadiene structure containing almost 100% of trans double bond was obtained from 1,5,9-cyclododecatriene containing cis, trans, trans- and trans, trans-1,5,9-cyclododecatriene in a ratio of 40:60.

Although no definite results were obtained from infrared spectra, polyoctenamer containing cis double bond in most part was obtained as semi-solid or viscous oily product from cis-cyclooctene.

The results mentioned above indicate important particularities of the heterogeneous solid catalyst of the present invention and the stereo regularity mentioned above is not so distinguished for the system containing homogeneous catalyst.

As Lewis acid to be used in the present invention, $AlCl_3$, $AlBr_3$, $TiCl_4$, $VCl_4$, $VOCl_3$, and the like can be selected, though the selection is not limited to these compounds. Among these, $AlCl_3$ is especially preferred for industrial use.

Aluminum trichloride used in the present can be added, without any treatment, to the system but yield may be preferably improved by adding aluminum trichloride, which is mixed and kneaded with tungsten trioxide for several hours before use.

A small amount of weak Lewis base such as diethyl ether or nitro-compound may be added to the catalyst systems above mentioned. Favorable results were obtained with organo aluminum compounds such as $C_2H_5AlCl_2$, $(C_2H_5)_2AlCl$, $(C_2H_5)_3Al$, and the like. Especially good conversion was found to be obtained with $C_2H_5AlCl_2$.

Of course, $C_2H_5AlCl_2$, $(C_2H_5)AlCl$ and $(C_2H_5)_3Al$ are classified as Lewis acid, and catalyst systems composed of these compounds and tungsten trioxide gave highly stereoregular polymer with good yield. 1

The mixing ratio of tungsten trioxide and Lewis acid is preferably from 1:3 to 1:30. This range produced high polymerization activity and rate. Anhydrous tungsten trioxide may be used without any treatment, or favorably, used with a carrier.

In a tri-component heterogeneous catalyst of tungsten trioxide, Lewis acid (excluding organo aluminum compound), and organo aluminum compound, the mole ratios to each other are preferably in the range of 1:(3 to 30):(3 to 30). The mole ratio of tungsten trioxide to organo aluminum compound is preferably between 1:3 to 1:30. Use of a lower ratio may possibly cause gel formation and is not necessary. Mixing of $WO_3$ and Lewis acid was at a temperature below 80°C. with no reaction therebetween.

The mole ratio of tungsten trioxide to monomer is advantageously as small as possible, but it is preferably within the range of from 1:100 to 1:10000 monomer.

According to the present invention, polymerization can be accomplished with or without the presence of diluting agent. Aliphatic hydrocarbon, aromatic hydrocarbon or halogenated hydrocarbon may be used as a diluting agent.

Polymerization reaction may be performed at a temperature within the range of from −50°C to 80°C and, more preferably, from 0°C to 60°C for more desirable results.

Polymers manufactured according to the present invention may be used as elastomer or plastics.

The principles of the invention are further illustrated by the following actual examples.

EXAMPLE 1.

Polymerization was accomplished in a flask equipped with a stirrer and tubes for introducing nitrogen and reagents.

Into the flask was added 0.1 m mole (0.0232 gram) of tungsten trioxide and then 0.3 m mole (0.400 gram) of aluminum chloride and then the content was mixed completely for one hour at room temperature. Then, 3 ml of anhydrous cis, cis-1,5-cyclooctadiene was added to the mixture and allowed to react for one hour at room temperature. The reaction was stopped by addition of methanol-benzene (1:9) solution of phenyl-$\beta$-naphthylamine (50 mg in 30 ml). The polymer obtained thereby was separated from solid catalyst by filtration, and then purified by precipitation with methanol. The rubber like product thus obtained was dried under vacuum at room temperature for complete removal of the solvent. Yield of the product was 0.64 gram. The polymerization rate for this mixing ratio of $WO_3$ to $AlCl_3$ was 24.5 % per hour. The ratio was ⅓.

The infrared spectrum of this polymer indicated the presence of 80% of cis-1,4- and 20% of trans-1,4-polybutadiene compounds in the polymer. No 1,2-polybutadiene group was found in the infrared spectrum. Its intrinsic viscosity in toluene at 30°C was found to be 0.16. Aluminum chloride used herein refers to $AlCl_3$.

EXAMPLE 2.

The same procedure was conducted as in Example 1. To a catalyst consisting of 0.1 m mole (0.0232 gram) of tungsten trioxide and 0.3 m mole (0.0400) of aluminum chloride were added 3 ml of cis, cis-1,5-cyclooctadiene and then 3 m mole of ethylaluminum dichloride (1 ml of toluene solution), and the mixture was subjected to reaction at room temperature for 1 hour. The product was purified with the same procedure as Example 1 to produce a rubber like polymer of 1.5 grams. The infrared spectrum of this polymer indicated the presence of the same components as in Example 1. The intrinsic viscosity thereof in toluene at 30°C was found to be 0.05.

EXAMPLE 3.

The same procedure as Example 1 was performed. To a catalyst consisting of 0.1 m mole (0.0232 gram) of tungsten trioxide and 0.3 m mole (0.0400 gram) of aluminum chloride were added 3 ml of cis, cis-1,5-cyclooctadiene and then 0.3 m mole of diethyl aluminum chloride (0.2 ml of toluene solution) and the mixture was subjected to reaction at room temperature for 1 hour. The product was purified with the same procedure as in Example 1 to produce a rubber like polymer of 0.71 gram. Infrared analysis of the product indicated that the resulting polymer contained 85% of cis-1,4 and 15% of trans-1,4-polybutadiene. The intrinsic viscosity of the polymer in toluene at 30°C was 0.13.

EXAMPLE 4.

The procedure of Example 1 was repeated except using 1,5,9-cyclododecatriene containing cis-trans-trans-isomer and trans-trans-trans-isomer in a 40/60 ratio in place of cis,cis-1,5-cyclooctadiene. To a catalyst of 0.1 m mole (0.0232 gram) of tungsten trioxide and 0.3 m mole (0.0400 gram) of aluminum chloride was added 2 ml of 1,5,9-cyclododecatriene. After reacting at room temperature for 1 hour, the product produced thereby was purified by the same procedure mentioned above, to give 0.122 gram of white solid polymer. Infrared analysis indicated that the polymer contained about 100% of trans-1,4-polybutadiene. The intrinsic viscosity of the polymer in toluene at 30°C was 0.06.

EXAMPLE 5 (CONTRAST)

Reaction was performed following the procedure of Example 1. To a catalyst of 0.1 m mole (0.0232 gram) of tungsten trioxide and 0.1 m mole (0.01348 gram) of aluminum chloride was added 2 ml of 1,5,9-cyclododecatriene. After reacting at room temperature for 1 hour the product thereof was purified by the same procedure mentioned above, to give 0.0523 gram of white solid polymer. The polymer had the same infrared spectrum as that of the polymer in Example 4. The intrinsic viscosity of the polymer in toluene at 30°C was the same as in Example 4. However, the polymerization rate for the ratio of $WO_3$ to $AlCl_3$ of 1/1 was only 3% per hour.

EXAMPLE 6.

The procedure of Example 1 was repeated except to use ethyl aluminum dichloride in place of aluminum chloride as Lewis acid. There was then added to the reaction mixture 0.1 m mole (0.0232 gram) of tungsten trioxide, 3 ml of 1,5,9-cyclododecatriene and then dropwise 3 ml of ethyl aluminum dichloride (1 ml of toluene solution), followed by subjecting the mixture to reaction at room temperature for 2 hours. The product thereof was purified by the same procedure as that in Example 1 to give 0.84 gram of white solid polymer. The polymer had the same infrared spectrum as that in Example 4. The intrinsic viscosity of the polymer in cyclohexane at 20°C was 0.04.

EXAMPLE 7.

The procedure of Example 1 was repeated using triethyl aluminum as Lewis acid. To a reaction vessel were added, 0.1 m mole (0.0232 gram) of tungsten trioxide, 3 ml of 1,5,9-cyclododecatriene and dropwise 6 m mole (2 ml of toluene solution) of triethyl aluminum. After reacting at room temperature for 3 hours, the reaction was stopped by conventional procedure to give 1.20 gram of polymer containing mostly gelled part. The infrared spectrum indicated that ungelled fraction of the polymer was exclusively trans-isomer as in Example 4. The gelling was caused by the mixing ratio being above the preferred range, namely 1/60.

EXAMPLE 8.

Reaction was performed following the procedure of Example 1. With additions of 0.1 m mole (0.0232 gram) of tungsten trioxide, 0.3 m mole (0.0400 gram)

of aluminum chloride, then 0.01 ml of diethyl ether as a catalyst, and 3 ml of 1,5,9-cyclododecatriene, the mixture thereof was subjected then to reaction at room temperature for 1 hour. The resulting white solid polymer was 0.124 gram. The infrared spectrum was the same as in Example 4. The intrinsic viscosity of the polymer in toluene at 30°C was 0.08.

EXAMPLE 9.

Following conventional method, 0.1 m mole (0.0232 gram) of tungsten trioxide, 0.3 m mole (0.0400 gram) of aluminum chloride, 3 ml of 1,5,9-cyclododecatriene and 0.3 ml of diethyl aluminum chloride (0.1 ml of toluene solution) were added and the mixture thereof reacted at room temperature for 1 hour, to thereby give 0.080 gram of white solid polymer. The infrared spectrum of the polymer was the same as in Example 4. The intrinsic viscosity of the polymer in toluene at 30°C was 0.02.

EXAMPLE 10.

Following the procedure in Example 1, reaction was performed. To 0.1 m mole (0.0232 gram) of tungsten trioxide was added 2 ml of 1,5,9-cyclododecatriene and then dropwise 3 m mole of ethyl aluminum dichloride (1 ml of toluene solution), followed by reacting the mixture at room temperature for 1 hour. The product was purified in the same manner as in Example 1 to give 1.13 gram of white solid polymer. The infrared spectrum of this polymer was the same as in Example 4. The viscosity (intrinsic) of the polymer in toluene at 30°C was 0.08. The polymerization rate for the molar ratio of $WO_3$ to ethyl aluminum dichloride of ⅓ was 65% per hour.

EXAMPLE 11.

The procedure of Example 1 was repeated except to use cis-cyclooctene as a monomer in place of cis-cis-1,5-cyclooctadiene, 0.1 m mole (0.0232 gram) of tungsten trioxide and 0.3 m mole (0.0400 gram) of aluminum chloride was well mixed and added thereto was 3 ml of cis-cyclooctene. After reacting the mixture at room temperature for 3 hours, the reaction was stopped by a conventional means to give 0.61 gram of semi-solid or oil-like polymer. The infrared spectrum of the polymer indicated that there were bands attributed to cis-oct-enamer as a major component and to trans-octenamer as a minor component.

EXAMPLE 12.

The reaction was performed following the procedure of Example 1. There was added 0.1 m mole (0.0232 gram) of tungsten trioxide, 0.3 m mole (0.0400 gram) of aluminum chloride as catalyst and 3 ml of cis-cyclooctene. Further added thereto dropwise was 3 ml of ethyl aluminum dichloride (1 ml of toluene solution). Then the mixture was reacted at room temperature for 2 hours to give 1.52 gram of semisolid polymer.

EXAMPLE 13.

Following conventional method, 0.1 m mole (0.0232 gram) of tungsten trioxide, 0.3 m mole (0.0400 gram) of aluminum chloride, 0.2 ml of 1,5,9-cyclododecatriene and 0.1 m mole of ethyl aluminum dichloride (0.1 ml of chlorobenzene solution) were added and the mixture thereof reacted at room temperature for 1 hour, to thereby give 0.11 gram of white solid polymer. The infrared spectrum of the polymer was the same as that for Example 4.

By mixing the tungsten trioxide and Lewis acid or Lewis acid and organo aluminum compound at a temperature of below 80°C, the compounds do not react with each other. The catalyst components are termed "heterogeneous". The catalyst are active during polymerization. Its components are not reacted with each other during initial mixing.

The foregoing description is intended to be illustrative of the principles of the invention. Numerous modifications and variations thereof would be apparent to the worker skilled in the art. All such modifications and variations are to be considered to be within the spirit and scope of the invention.

What is claimed is:

1. A process for manufacturing a polymer, comprising the steps of
    preparing a heterogeneous catalyst by mixing at a temperature below 80°C tungsten trioxide and Lewis acid in a molar ratio of from 1:3 to 1:30, or by mixing at a temperaure below 80°C tungsten trioxide, Lewis acid (except organo aluminum compound) and organo aluminum compound in a molar ration of from 1:(3–30):(3–30); and
    polymerizing cycloolefins having at least one double bond in a ring structure consisting of from 7 to 12 carbons, at a temperature within the range of from −50°C to 80°C, in the presence of said heterogeneous catalyst, wherein said tungsten trioxide and said cycloolefin are in amounts in the molar ratio of from 1:100 to 1:10000.

2. Process of claim 1, wherein said cycloolefin is selected from the group consisting of 1,5-cyclooctadiene, 1,5,9-cyclododecatriene, cyclooctene and mixtures thereof.

3. Process of claim 1, wherein said Lewis acid is $AlCl_3$, $AlBr_3$, $TiCl_4$, $VCl_4$, or $VOCl_3$.

4. Process of claim 1, wherein said organoaluminum compound is aluminum trialkyl, aluminum haloalkyl or a mixture thereof.

5. Process of claim 1, wherein said Lewis acid is aluminum trichloride.

6. Process of claim 1, wherein aluminum trichloride is first mixed and kneaded with tungsten trioxide.

7. Process of claim 1, wherein any one or more of the following are added to said catalyst; $C_2H_5AlCl_2$; $(C_2H_5)_2AlCl$; $(C_2H_5)_3Al$ and mixtures thereof.

8. Process of claim 1, wherein polymerization is in the presence of aliphatic hydrocarbon, aromatic hydrocarbon, or halogenated hydrocarbon.

* * * * *